Patented Oct. 24, 1933

1,931,858

UNITED STATES PATENT OFFICE 1,931,858

PRODUCTION OF UNSATURATED ETHERS

Karl Baur, Ludwigshafen-on-the-Rhine, Germany, assignor to I. G. Farbenindustrie Aktiengesellschaft, Frankfort-on-the-Main, Germany No Drawing. Application September 24, 1930, Serial No. 484,247, and in Germany October 23, 1929

11 Claims. (Cl. 260—151)

The present invention relates to the production of unsaturated ethers.

It has already been suggested to produce unsaturated ethers by leading acetals in the gaseous phase at elevated temperatures over clay sherds or finely divided nickel. When working by these methods certain by-products are, however, formed in considerable quantities and consequently the reaction cannot be carried out economically.

I have now found that acetals are converted into unsaturated ethers in an advantageous manner and with good yields by contacting acetals in the vaporous state with precious metals that is silver, gold and the platinum metals, in a finely divided form as such or in admixture with each other. The metals are preferably employed on carriers. As carriers may be mentioned for example the usual mineral, ceramic or metallic substances, active gels such as alumina gel, silica gel and the like, active or non-active charcoal and the like. In this manner the splitting off of alcohol may take place even under mild conditions and without the formation of appreciable quantities of by-products. In certain cases it is advantageous to incorporate activating or stabilizing substances as for example heat resisting substances from metals other than alkali metals, belonging to the groups of the periodic system on either side of the fifth group, or compounds of such metals. Thus for example finely divided metals other than precious metals and alkali metals or readily or difficulty reducible metal oxides or heat resisting salts, such as phosphates or silicates, may be added to the aforesaid precious metal catalysts. The aforesaid additions may be chosen for example from copper, magnesium, calcium or the other alkaline earth or rare earth metals, zinc, cadmium, aluminium, titanium, tin, lead, thorium or zirconium, chromium, molybdenum, tungsten, uranium, manganese and the metals of the iron group, and their oxides and heat resisting salts. The alkali metals, lithium, sodium, potassium and rubidium as well as the metals of the fifth group do not give valuable effects and are therefore excluded.

The reaction may be carried out with particularly good results with acetals of aliphatic or aromatic aldehydes which are capable of being vaporized at atmospheric or reduced pressures without decomposition. Generally speaking the splitting off of alcohol proceeds endothermically and is preferably carried out at temperatures between 100° and 450° C., temperatures between about 200° and 350° C. being usually sufficient. The vaporized acetals may be employed alone as such or in admixture with a volatile inert diluent such as gases or vapors as for example nitrogen, carbon dioxide, methane, small quantities of water vapor, or vapors of alcohols, ethers or hydrocarbons such as benzene or benzine, and the process may be carried out at atmospheric or reduced pressure, such as any pressure down to about 20 millimeters mercury gauge.

The following examples will further illustrate the nature of this invention, but the invention is not restricted to these examples. The parts by weight and by volume are calculated with reference to the metric system.

Example 1

400 grams of asbestos on whch 10 per cent of its weight of palladium is deposited are uniformly distributed in a reaction chamber of 4 liters. The vapors of the diethyl acetal of acetaldehyde [$CH_3-CH=(O-C_2H_5)_2$] 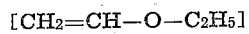 are passed at a temperature of 270° C. with a velocity of about 500 grams per hour over the catalyst. The vapors escaping from the reaction chamber are continuously fractionated, the fraction below 40° C. being almost pure vinyl ethyl ether

[$CH_2=CH-O-C_2H_5$]

which is obtained in a good yield. The fraction of the reaction product boiling above 40° C. consists of ethyl alcohol and unchanged acetal, and since there are no contaminating by-products in this mixture the same may readily be employed for example for the preparation of acetaldehyde di-ethyl acetal.

Example 2

Vapors of acetaldehyde di-n-butyl acetal

[$CH_3-CH=(O-C_4H_9)_2$] 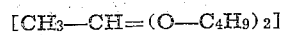

are passed at 300° C. over palladium deposited on asbestos as described in Example 1. By cooling the vapors leaving the reaction vessel, vinyl n-butyl ether [$CH_2=CH-O-C_4H_9$], having a boiling point of from 92° to 93° C., is obtained in a yield of about 75 per cent of the theoretical yield.

Example 3

400 grams of a catalyst prepared from an ammoniacal solution of silver carbonate and fibrous asbestos and containing 10 per cent by weight of the whole catalyst of metallic silver is loosely arranged in a reaction vessel having a content of 4 liters. Vapors of acetone di-ethyl acetal [$(CH_3)_2=C=(O-C_2H_5)_2$] are passed at 280° C. over the aforesaid catalyst at a velocity of from 400 to 600 grams of the acetal per hour. From the condensate iso-propenyl ethyl ether (alpha-methyl-vinyl ethyl ether

is obtained by distillation, small quantities of alcohol being removed with the aid of metallic sodium. The ether thus purified boils at 735 millimeters mercury gauge at from 61° to 62° C. and is obtained in a yield of about 60 per cent of the theoretical yield.

*Example 4*

Vapors of propionaldehyde di-ethyl acetal [$CH_3-CH_2-CH=(O-C_2H_5)_2$] are passed at 280° C. over silver deposited on asbestos as described in Example 3. From the condensate n-propenyl ethyl ether (beta-methyl-vinyl ethyl ether [$CH_3-CH=CH-O-C_2H_5$]) boiling after purification at 69° C. is obtained in a yield of about 75 per cent of the theoretical yield.

*Example 5*

A solution of 75 grams of silver carbonate in aqueous ammonia, prepared while cooling, is mixed with 0.6 kilogram of kieselguhr and slowly evaporated to dryness while continuously stirring. The mass is then moulded into small cylinders which are then heated in a current of air to 200° C. The catalyst is then introduced into a reaction vessel having a content of 0.4 liter. After treating the catalyst with hydrogen at 250° C. for about 12 hours vapors of n-butyr aldehyde di-methyl acetal

[$CH_3-CH_2-CH_2-CH=(O-CH_3)_2$]

are passed through the reaction vessel at 250° C. and at a velocity of 60 grams of the acetal per hour. From the condensate the main quantities of methyl alcohol formed are removed with the aid of calcium chloride. By distilling the product in the presence of a small quantity of metallic sodium, n-butenyl methyl ether (β-ethyl-vinyl methyl ether [$CH_3-CH_2-CH=CH-O-CH_3$]), boiling at from 73° to 74° C. at 749 millimeters mercury gauge is obtained in a yield of 75 per cent of the theoretical yield.

*Example 6*

0.45 kilogram of clay sherds of about bean size is moistened with an aqueous solution of 15 grams of uranyl nitrate and then dried. After heating to 400° C. for a long time, the sherds pretreated in the aforesaid manner are soaked with a solution of 45 grams of silver carbonate in aqueous ammonia prepared while cooling. After drying and treating the catalyst at 270° C. with hydrogen, vapors of acetophenone di-ethyl acetal

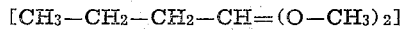

mixed with about 15 per cent their volume of nitrogen are passed at 220° C. over the aforesaid catalyst. From the distillate alpha-ethoxy styrene (alpha-phenyl-vinyl ethyl ether

having a boiling point of from 93° to 96° C. at 12.5 millimeters mercury gauge is obtained by distillation in a yield of 85 per cent of the theoretical yield.

*Example 7*

Vapors of acetaldehyde di-(ethyl-2-ethoxy) acetal (ethylene glycol mono-ethyl ether acetaldehyde acetal

[$CH_3-CH=(O-C_2H_4-OC_2H_5)_2$])

are passed at 260° C. over platinum deposited on asbestos as described in Example 1. From the condensate, which still contains from 30 to 40 per cent of unaltered acetal, vinyl (2-ethoxy-ethyl) ether (alpha-vinyl β-ethyl ethylene di-ether [$CH_2=CH-O-C_2H_4-O-C_2H_5$]) having a boiling point of 128° C. at 757 millimeters mercury gauge is obtained in a yield of about 60 per cent of the theoretical yield.

What I claim is:—

1. In the catalytic production of unsaturated ethers from acetals the step which comprises contacting vapors of an acetal, while heating, with a catalytic substance essentially containing a precious metal in a finely divided form.

2. In the catalytic production of unsaturated ethers from acetals the step which comprises contacting vapors of an acetal, while heating, with a catalytic substance essentially containing a precious metal deposited in a finely divided form on a carrier.

3. In the catalytic production of unsaturated ethers from acetals the step which comprises contacting vapors of an acetal, while heating to a temperature between 100° and 450° C., with a catalytic substance essentially containing a precious metal in a finely divided form.

4. In the catalytic production of unsaturated ethers from acetals the step which comprises contacting vapors of an acetal in mixture with a volatile inert diluent, while heating to a temperature etween 200° and 350° C., with a catalytic substance essentially containing a precious metal deposited in a finely divided form on a carrier.

5. In the catalytic production of unsaturated ethers from acetals the step which comprises contacting vapors of an aliphatic acetal, while heating to a temperature between 200° and 350° C., with a catalytic substance essentially containing a precious metal deposited in a finely divided form on a carrier.

6. In the catalytic production of unsaturated ethers from acetals the step which comprises contacting vapors of an aliphatic acetal, while heating to a temperature between 200° and 350° C. with a catalytic substance essentially containing, deposited in a finely divided form on a carrier, a precious metal and another heat resisting substance selected from the class consisting of metals other than alkali metals, belonging to the groups of the periodic system on either side of the fifth group, and compounds of such metals.

7. In the catalytic production of unsaturated ethers from acetals the step which comprises contacting vapors of an aliphatic acetal, while heating to a temperature between 200° and 350° C., with a catalytic substance essentially containing metallic silver deposited in a finely divided form on a carrier.

8. In the catalytic production of unsaturated ethers from acetals the step which comprises contacting vapors of an aliphatic acetal, while heating to a temperature between 200° and 350°

C., with a catalytic substance essentially containing metallic palladium deposited in a finely divided form on a carrier.

9. In the catalytic production of unsaturated ethers from acetals the step which comprises contacting vapors of an aliphatic acetal of a mono-alkyl ether of a glycol, while heating to about 260 C., with a catalytic substance essentially containing a precious metal in a finely divided form.

10. A vinyl ether of a mono-alkyl ether of a glycol.

11. The vinyl ether of ethylene glycol mono-ethyl ether.

KARL BAUR.